(12) United States Patent
     Han

(10) Patent No.: US 12,597,629 B2
(45) Date of Patent: Apr. 7, 2026

(54) METHOD OF MANUFACTURING SECONDARY BATTERY

(71) Applicant: LG ENERGY SOLUTION, LTD., Seoul (KR)

(72) Inventor: Jeonghui Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 18/022,909

(22) PCT Filed: Jan. 19, 2022

(86) PCT No.: PCT/KR2022/000994
     § 371 (c)(1),
     (2) Date: Feb. 23, 2023

(87) PCT Pub. No.: WO2022/158853
     PCT Pub. Date: Jul. 28, 2022

(65) Prior Publication Data
     US 2023/0318013 A1     Oct. 5, 2023

(30) Foreign Application Priority Data
     Jan. 20, 2021     (KR) ........................ 10-2021-0008179

(51) Int. Cl.
     *H01M 10/04*          (2006.01)
(52) U.S. Cl.
     CPC ... *H01M 10/0431* (2013.01); *H01M 10/0422* (2013.01)
(58) Field of Classification Search
     None
     See application file for complete search history.

(56) References Cited

U.S. PATENT DOCUMENTS

| 4,802,275 A | 2/1989 | Freluche |
| 4,929,519 A | 5/1990 | Catotti |
| | (Continued) | |

FOREIGN PATENT DOCUMENTS

| JP | 63-241879 A | 10/1988 |
| JP | 3-116654 A | 5/1991 |
| | (Continued) | |

OTHER PUBLICATIONS

KR 20040042375 A Machine Translation (Year: 2004).*
(Continued)

*Primary Examiner* — Mark Ruthkosky
*Assistant Examiner* — Sarah J Jacobson
(74) *Attorney, Agent, or Firm* — Birch, Stewart, Kolasch & Birch, LLP

(57) ABSTRACT

A method of manufacturing a secondary battery includes manufacturing an electrode assembly by winding a first electrode, a second electrode, and a separator together; attaching a tape to cover an outermost edge portion of the electrode assembly; accommodating the electrode assembly in a battery casing having an open end; and removing the tape attached to the electrode assembly from the electrode assembly. The tape includes a first portion attached to the electrode assembly, and a second portion extending from the first portion in a first direction towards the open end of the battery casing. In the removing the tape, the tape is removed by pulling the second portion.

11 Claims, 12 Drawing Sheets

(56) References Cited

U.S. PATENT DOCUMENTS

| | | | | |
|---|---|---|---|---|
| 5,184,997 | A | * | 2/1993 | James ................ B65D 5/0236 |
| | | | | 53/136.4 |
| 2006/0251962 | A1 | | 11/2006 | Kim |
| 2010/0291432 | A1 | | 11/2010 | Kim |
| 2013/0202932 | A1 | | 8/2013 | Song et al. |
| 2015/0147640 | A1 | | 5/2015 | Kim et al. |
| 2016/0126583 | A1 | | 5/2016 | Kato et al. |
| 2020/0335828 | A1 | | 10/2020 | Sakurai |
| 2023/0299443 | A1 | * | 9/2023 | Kim .................... H01M 50/595 |
| | | | | 429/94 |

FOREIGN PATENT DOCUMENTS

| | | | |
|---|---|---|---|
| JP | 11-273743 | A | 10/1999 |
| JP | 2001-196090 | A | 7/2001 |
| JP | 2003-187874 | A | 7/2003 |
| JP | 2006-302801 | A | 11/2006 |
| JP | 2011-34859 | A | 2/2011 |
| JP | 2012-529753 | A | 11/2012 |
| KR | 10-2004-0042375 | A | 5/2004 |
| KR | 20040042375 | A * | 5/2004 |
| KR | 10-0686813 | B1 | 2/2007 |
| KR | 10-1152651 | B1 | 6/2012 |
| KR | 10-1156235 | B1 | 6/2012 |
| KR | 10-2013-0090190 | A | 8/2013 |
| KR | 10-2016-0021514pA | | 2/2016 |
| KR | 10-1835215 | B1 | 3/2018 |
| KR | 10-2020-0123741 | A | 10/2020 |

OTHER PUBLICATIONS

International Search Report (PCT/ISA/210) issued in PCT/KR2022/000994, dated May 4, 2022.

Extended European Search Report for European Application No. 22742829.9, dated Dec. 9, 2024.

* cited by examiner

【Figure 1】
RELATED ART
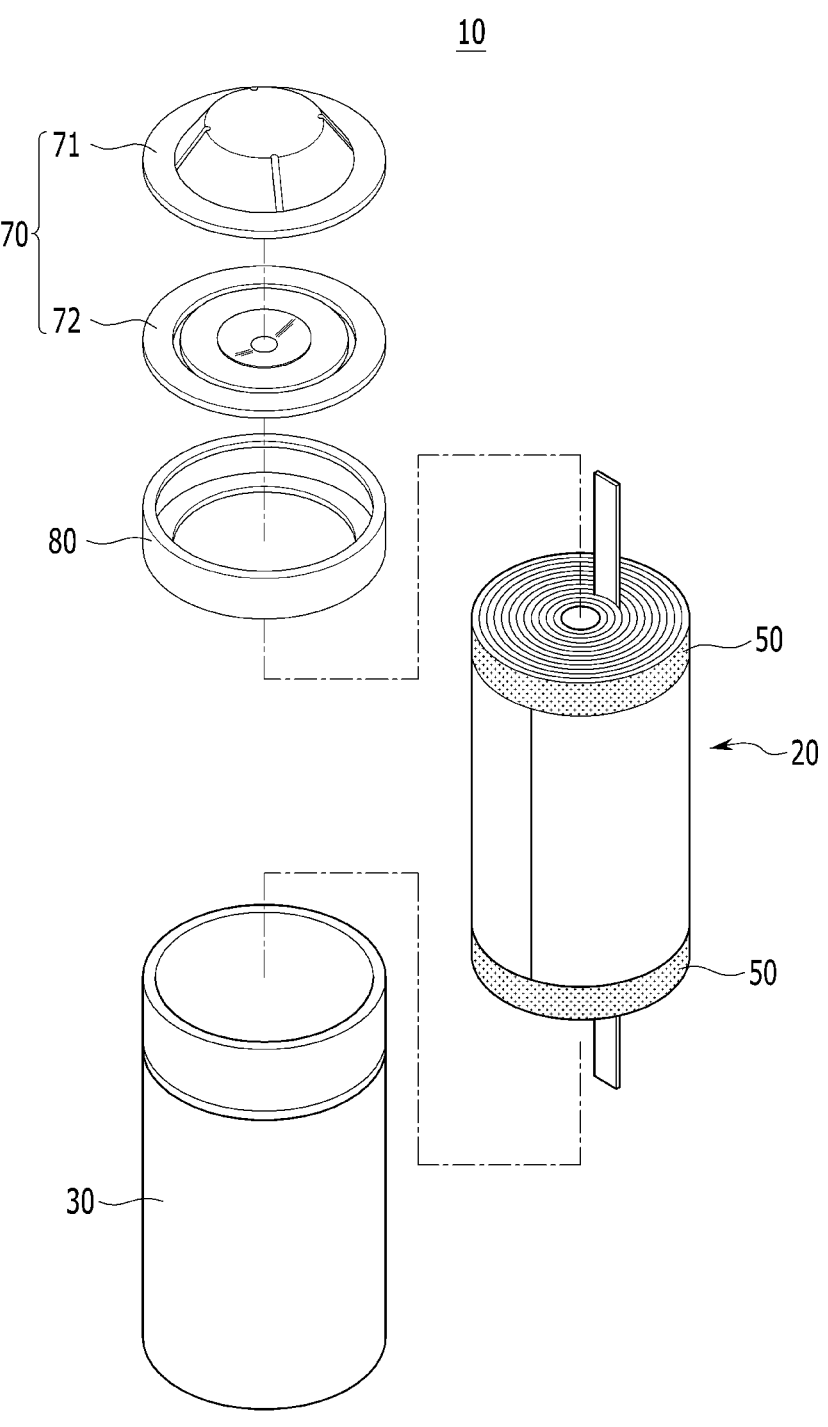

【Figure 2】
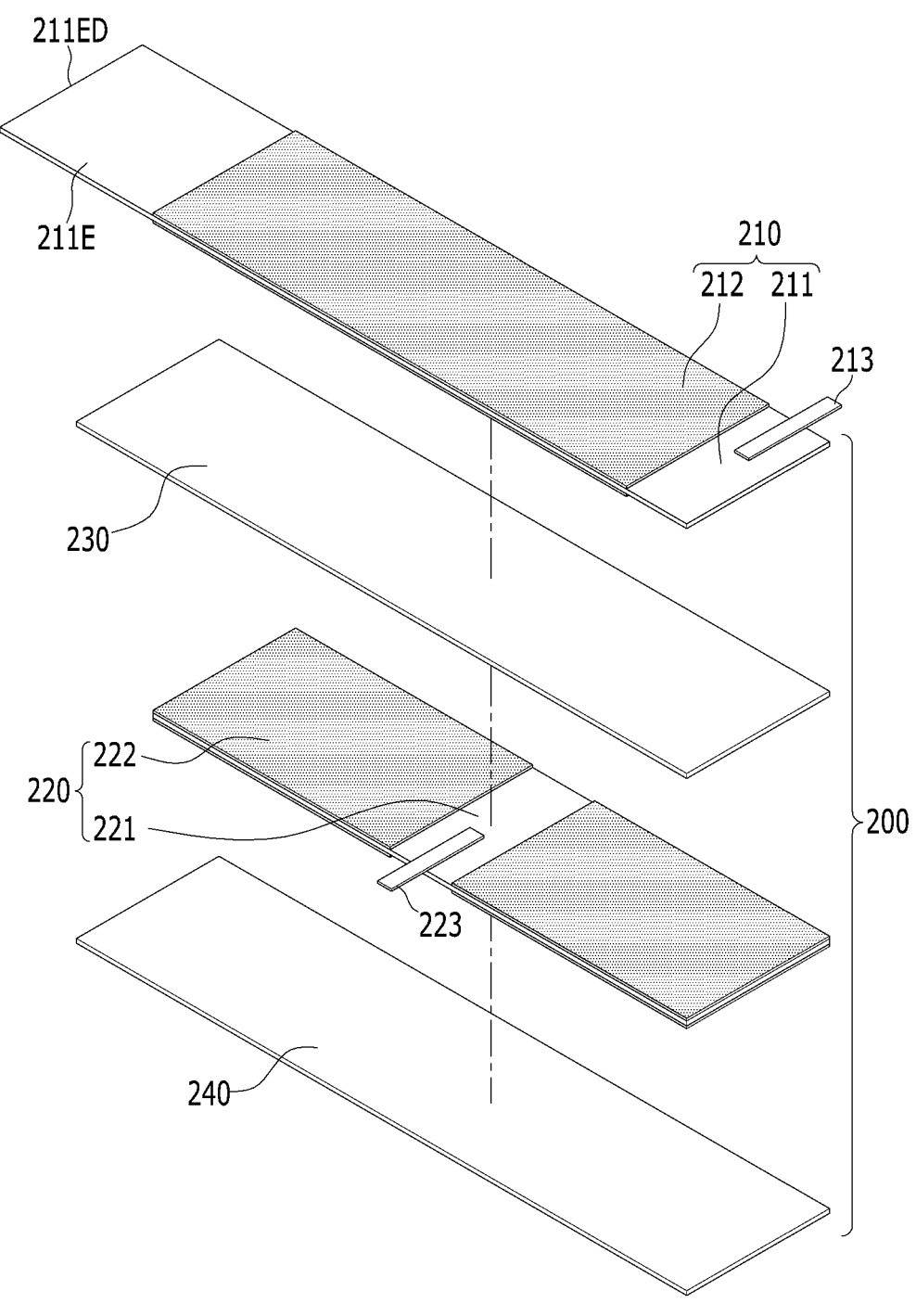

【Figure 3】
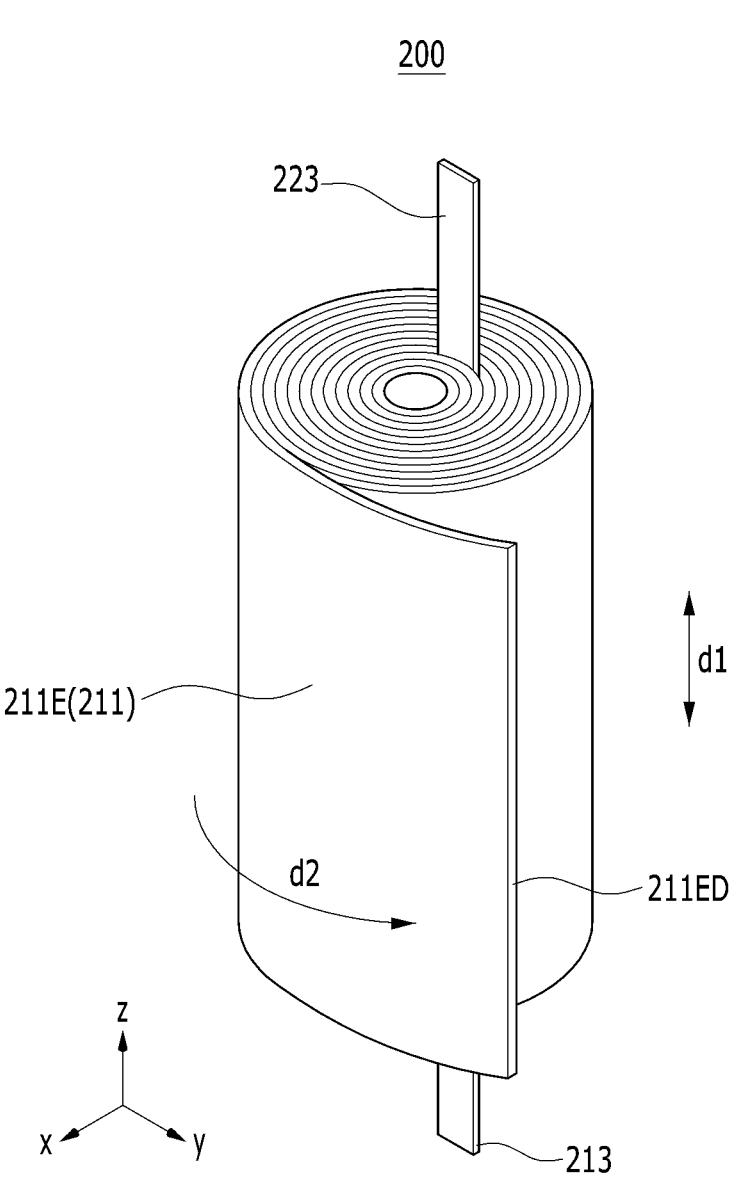

【Figure 4】
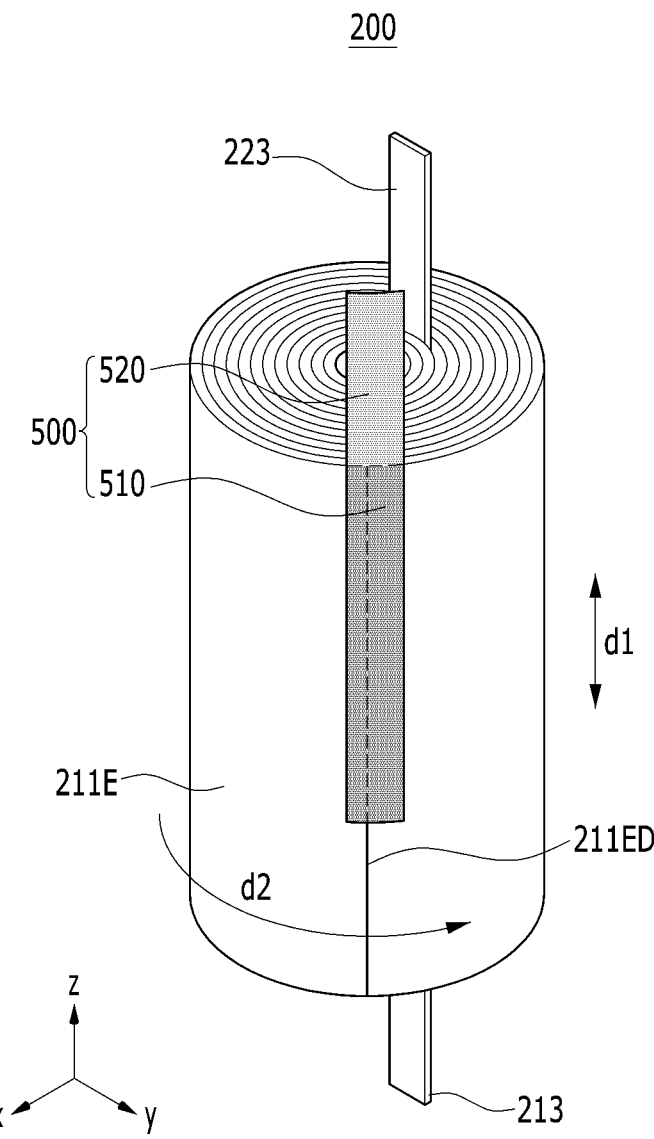

【Figure 5】
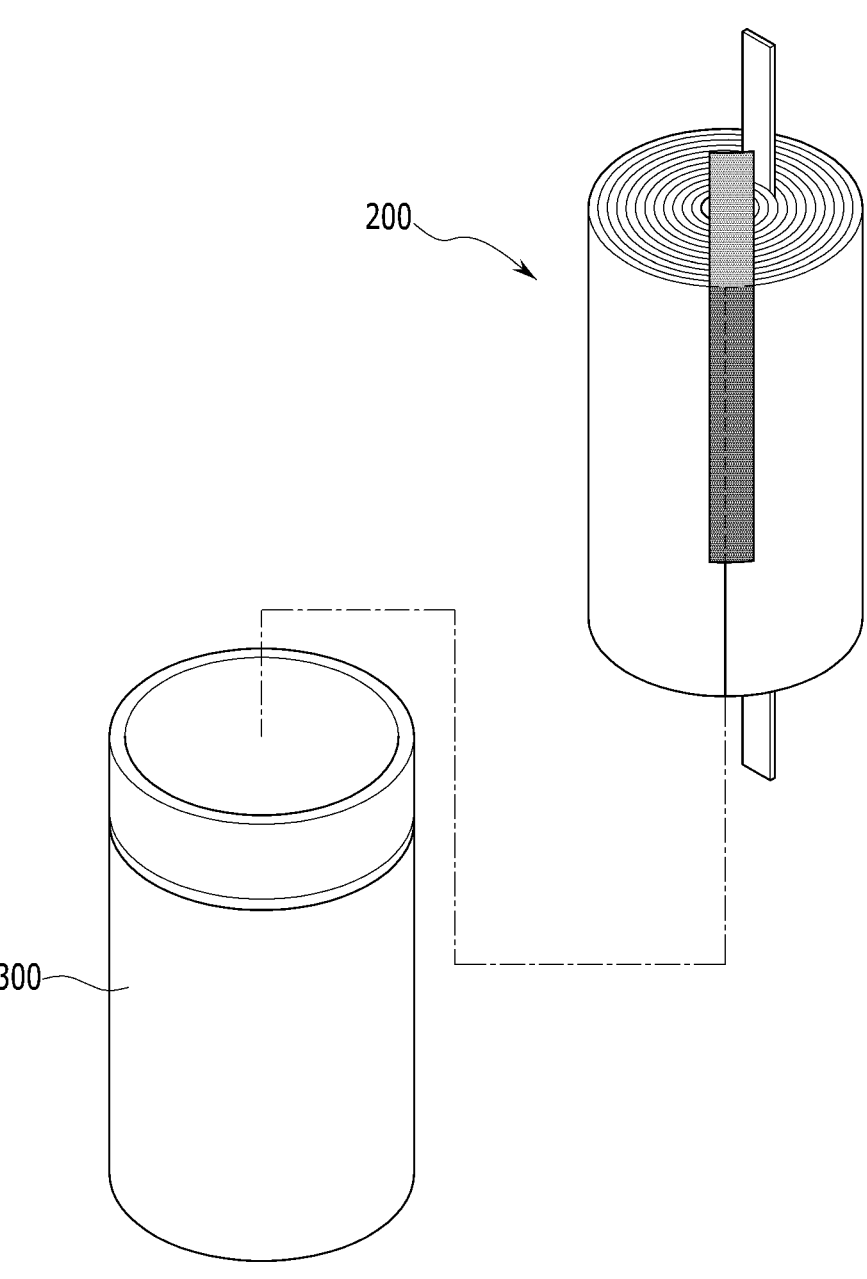

【Figure 6】
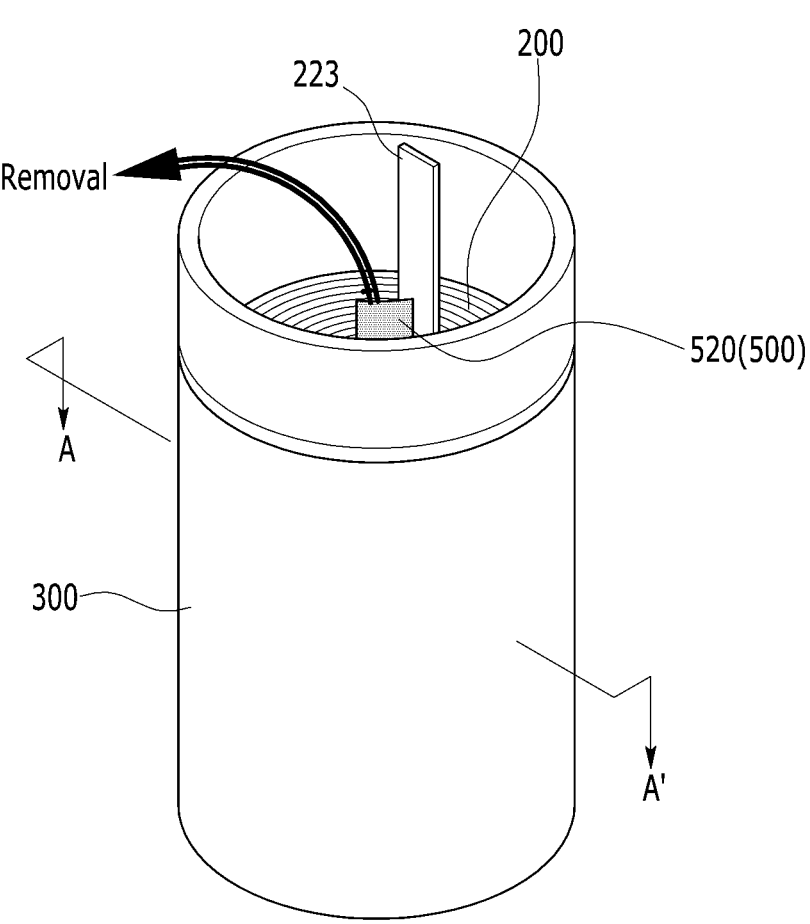

【Figure 7】
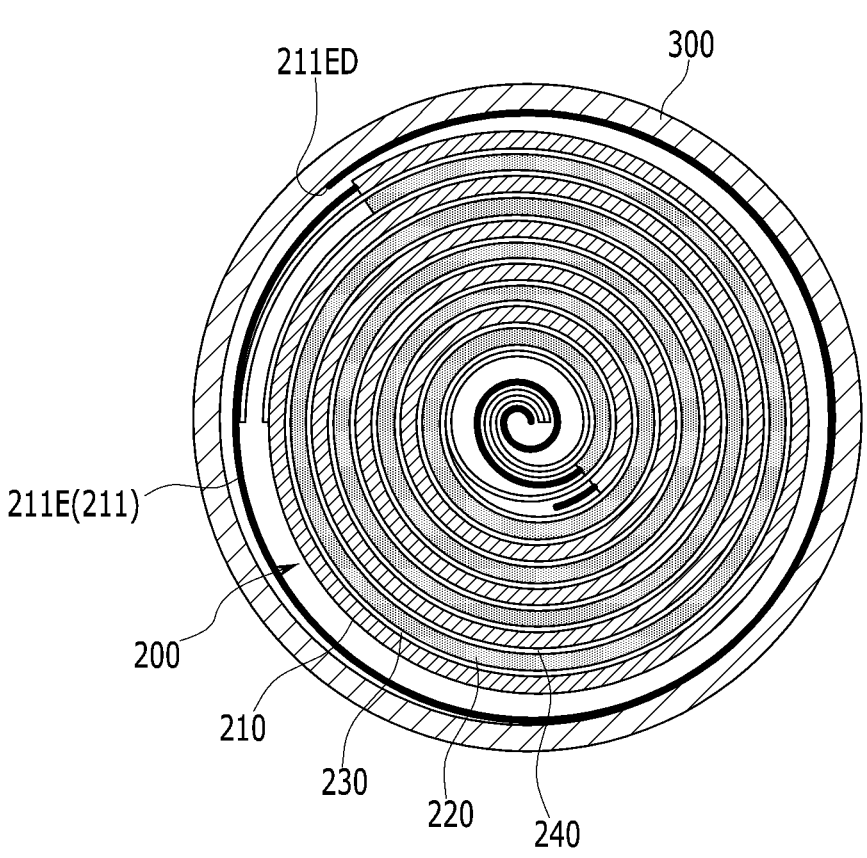

【Figure 8】
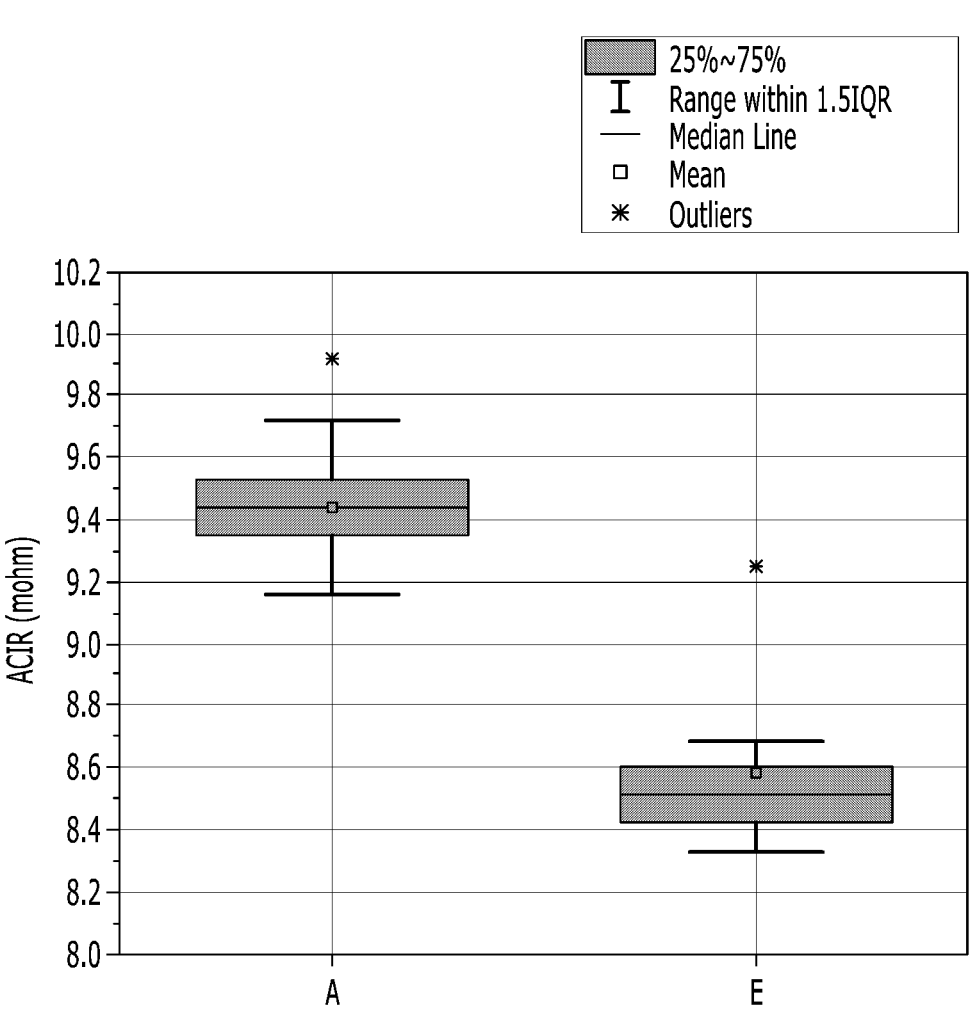

【Figure 9】
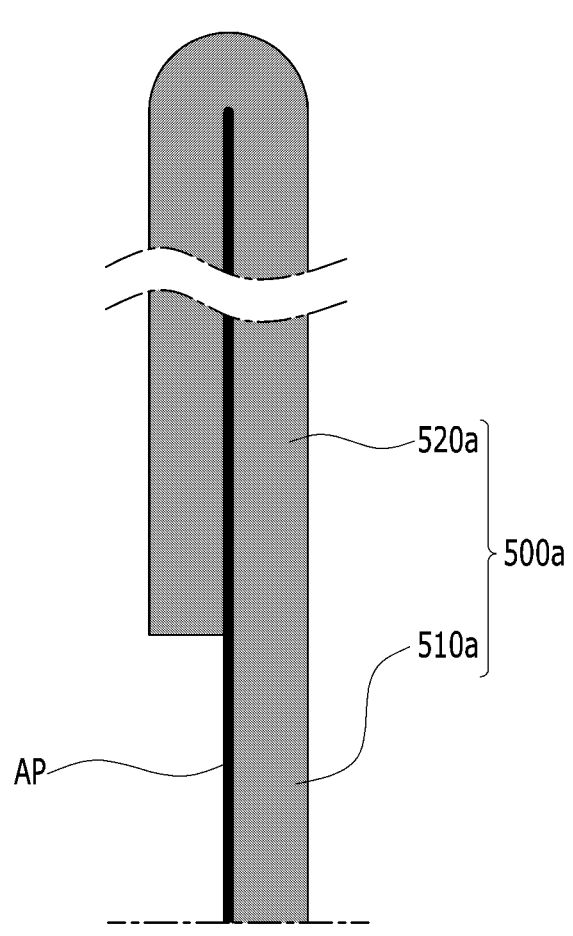

【Figure 10】
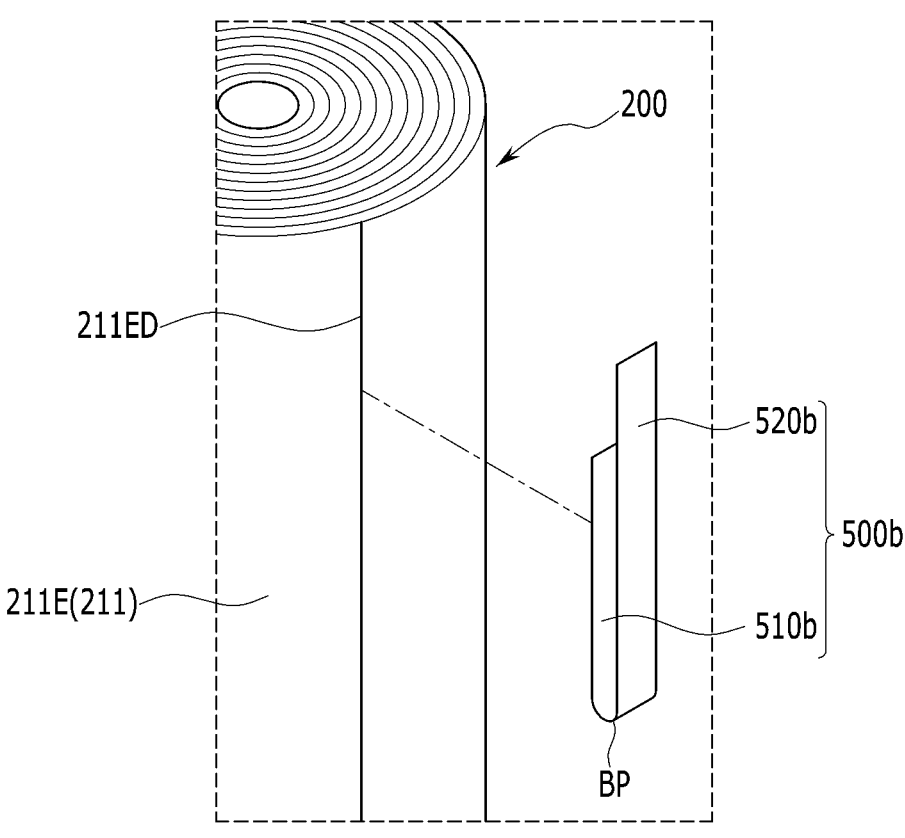

【Figure 11】
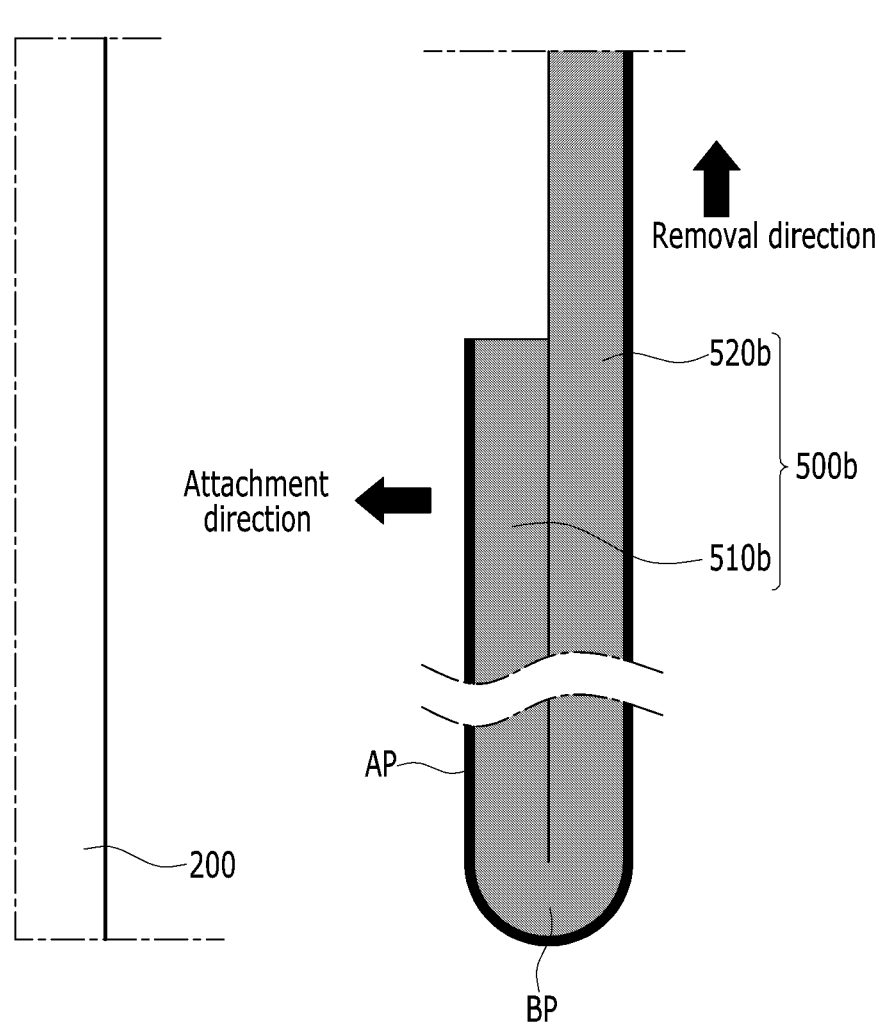

【Figure 12】
100
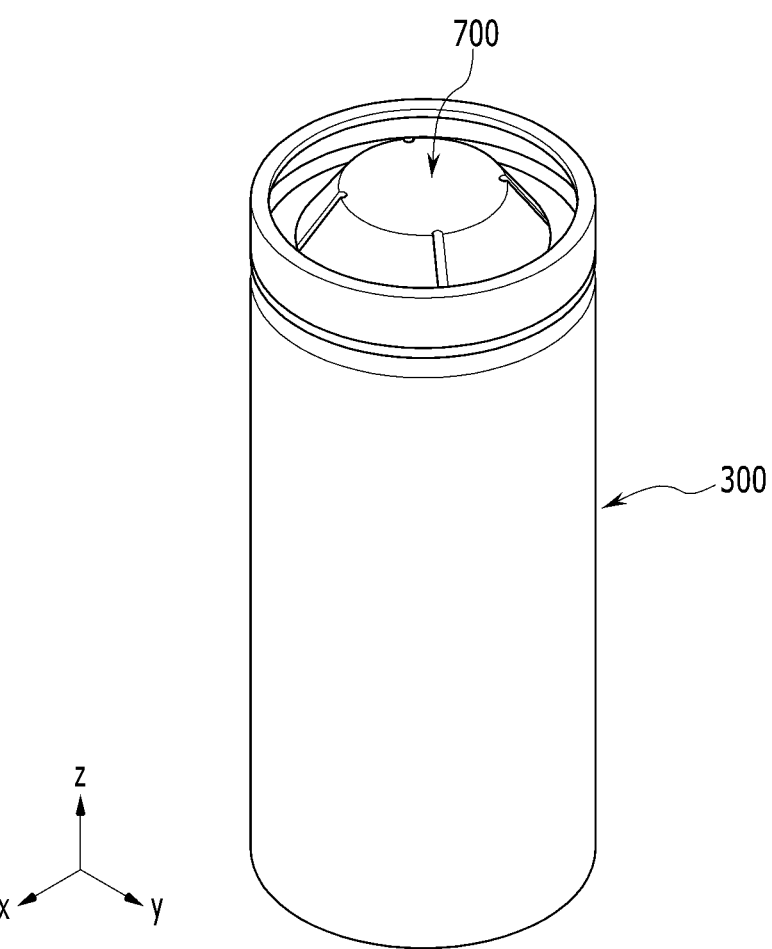

METHOD OF MANUFACTURING SECONDARY BATTERY

TECHNICAL FIELD

Cross-Reference to Related Application(s)

This application claims priority to and the benefit of Korean Patent Application No. 10-2021-0008179 filed in the Korean Intellectual Property Office on Jan. 20, 2021, the entire contents of which are incorporated herein by reference.

The present invention relates to a method of manufacturing a secondary battery, and more particularly, to a method of manufacturing a secondary battery including a jelly-roll electrode assembly.

BACKGROUND ART

Recently, there is an increasing demand for portable electronic products such as laptops, video cameras, and mobile phones, and the research and development are being actively conducted on electric vehicles, energy storage batteries, robots, satellites, and the like. Therefore, lots of studies are being conducted on secondary batteries used as driving power sources.

For example, a nickel cadmium battery, a nickel hydrogen battery, a nickel zinc battery, a lithium secondary battery, and the like are used as the secondary battery. Among these batteries, in comparison with the nickel-based secondary battery, the lithium secondary battery causes almost no memory effect and thus is freely charged and discharged. Further, the lithium secondary battery has a very low self-discharge rate, a high operating voltage, and a high energy density per unit weight, and thus the lithium secondary battery is widely used in a cutting-edge electronic device field.

Depending on shapes of battery casings, the secondary batteries are classified into a cylindrical battery having an electrode assembly embedded in a cylindrical metal can, an angular battery having an electrode assembly embedded in an angular metal can, and a pouch-type battery having an electrode assembly embedded in a pouch-type casing configured by an aluminum laminated sheet. Among these batteries, the cylindrical battery advantageously has a relatively large capacity and is structurally stable.

The electrode assembly embedded in the battery casing is a power generating element that is chargeable and dischargeable and has a layered structure including a positive electrode, a separator, and a negative electrode. The electrode assemblies are classified into a jelly-roll electrode assembly, a stack electrode assembly, and a stack/folding electrode assembly. The jelly-roll electrode assembly is made by winding positive and negative electrodes with a separator interposed therebetween, the positive and negative electrodes each being provided in the form of a long sheet onto which an active material is applied. The stack electrode assembly is made by sequentially stacking a plurality of positive electrodes having a predetermined size and a plurality of negative electrodes having a predetermined size with separators interposed therebetween. The stack/folding electrode assembly is a combination of the jelly-roll electrode assembly and the stack electrode assembly. Among these electrode assembly, the jelly-roll electrode assembly is advantageously easy to manufacture and has a high energy density per weight.

FIG. 1 is an exploded perspective view of a cylindrical secondary battery in the related art.

Referring to FIG. 1, a cylindrical secondary battery 10 may be manufactured by accommodating a jelly-roll electrode assembly 20 in a cylindrical battery casing 30, injecting an electrolyte into the battery casing 30, and then coupling a cap assembly 70 to an upper end of the battery casing 30.

The cap assembly 70 may include an upper end cap 71 configured to define a positive electrode terminal, and a cap plate 72 configured to be in close contact with the upper end cap 71. The cap assembly 70 and the battery casing 30 are coupled by crimping coupling, such that the secondary battery 10 may be sealed. In this case, a gasket 80 may be positioned between the cap assembly 70 and the battery casing 30 in order to improve sealability.

In this case, an electrode current collector of an electrode sheet included in the electrode assembly 20 may be exposed to an outer peripheral surface of the electrode assembly 20. The exposed electrode current collector is brought into contact with an inner wall of the battery casing 30, such that it is possible to ensure an electron movement route in addition to an electrode tab and reduce resistance of the secondary battery. In addition, the electrode current collector is in direct contact with the inner wall of the battery casing 30, such that the heat dissipation performance is improved.

However, a sealing tape 50 is generally attached to an outer peripheral surface of the jelly-roll electrode assembly in order to prevent the jelly-roll electrode assembly from being unwound. The sealing tape 50 is attached only to a part of the outer peripheral surface of the electrode assembly 20 without being attached to the entire outer peripheral surface of the electrode assembly 20 in order to guide the contact between the electrode current collector and the battery casing 30. However, the presence of the sealing tape 50 acts as a factor that hinders the reduction in resistance and the improvement of the heat dissipation performance.

DISCLOSURE

Technical Problem

The present invention has been made in an effort to provide a method of manufacturing a secondary battery, which is capable of increasing a contact area between an electrode current collector and an inner wall of the battery casing.

However, the object to be achieved by the embodiments of the present invention is not limited to the above-mentioned object but may be variously expanded without departing from the technical spirit of the present invention.

Technical Solution

An exemplary embodiment of the present invention provides a method of manufacturing a secondary battery, the method including: manufacturing an electrode assembly by winding a first electrode, a second electrode, and a separator together; attaching a tape to cover an outermost edge portion of the electrode assembly; accommodating the electrode assembly in a battery casing having an open end; and removing the tape attached to the electrode assembly from the electrode assembly. The tape may include a first portion attached to the electrode assembly, and a second portion extending from the first portion in a first direction towards the open end of the battery casing. In the removing the tape, the tape may be removed by pulling the second portion.

The tape may extend in an axial direction of the electrode assembly to cover the outermost edge portion of the electrode assembly.

The first electrode may include a first electrode current collector, and a first active material layer formed by applying an electrode active material onto the first electrode current collector, and the first electrode current collector may include an exposed portion exposed to an outer peripheral surface of the electrode assembly of which the exposed portion includes the outermost edge portion.

As the tape is removed in the removing the tape, the electrode assembly may be unwound in the battery casing, and the exposed portion may contact an inner wall of the battery casing.

The second portion of the tape may extend in the first direction from the electrode assembly and be exposed.

The second portion may be a portion having no adhesiveness.

The second portion may be folded so that portions of the second portion having adhesiveness face each other.

The tape may include a bending portion that is a portion curved between the first portion and the second portion.

The bending portion may be formed at lower sides of the first portion and the second portion.

In the removing the tape, the tape may be removed by pulling the second portion in the axial direction.

A portion of the first portion, which has adhesiveness, may be positioned to face toward the electrode assembly, and a portion of the second portion, which has adhesiveness, may be positioned to face away from to the electrode assembly.

The battery casing may be a cylindrical casing.

Advantageous Effects

According to the embodiments of the present invention, the structure in which the tape attached to the outer peripheral surface of the electrode assembly may be easily removed is provided. Further, the tape is removed in the state in which the electrode assembly is accommodated in the battery casing. Therefore, it is possible to maximize the contact area between the inner wall of the battery casing and the electrode current collector exposed to the outer peripheral surface of the electrode assembly.

The effects of the present invention are not limited to the aforementioned effects, and other effects, which are not mentioned above, will be clearly understood by those skilled in the art from the claims.

DESCRIPTION OF THE DRAWINGS

FIG. 1 is an exploded perspective view of a cylindrical secondary battery in the related art.

FIG. 2 is an exploded perspective view illustrating a state in which an electrode assembly according to an embodiment of the present invention is disassembled before the electrode assembly is wound.

FIG. 3 is a perspective view illustrating a state in which the electrode assembly in FIG. 2 is wound.

FIG. 4 is a perspective view illustrating a state in which a tape is attached to an outer peripheral surface of the electrode assembly in FIG. 3.

FIG. 5 is a perspective view illustrating a state in which the electrode assembly in FIG. 4 is accommodated in a battery casing.

FIG. 6 is a perspective view illustrating a step of removing the tape from the electrode assembly according to the embodiment of the present invention.

FIG. 7 is a cross-sectional view illustrating a cross-section taken along cutting line A-A' in FIG. 6.

FIG. 8 is a graph for comparing resistance characteristics between a secondary battery including the electrode assembly according to the embodiment of the present invention and a secondary battery including an electrode assembly in the related art.

FIG. 9 is a partial view illustrating an upper portion of a tape according to another embodiment of the present invention.

FIG. 10 is a perspective view illustrating an electrode assembly and a tape according to a modified embodiment of the present invention.

FIG. 11 is a top plan view illustrating the electrode assembly and the tape in FIG. 10.

FIG. 12 is a perspective view illustrating the secondary battery to which a cap assembly is coupled.

MODE FOR INVENTION

Hereinafter, several exemplary embodiments of the present invention will be described in detail with reference to the accompanying drawings so that those with ordinary skill in the art to which the present invention pertains may easily carry out the exemplary embodiments. The present invention may be implemented in various different ways and is not limited to the embodiments described herein.

A part irrelevant to the description will be omitted to clearly describe the present invention, and the same or similar constituent elements will be designated by the same reference numerals throughout the specification.

In addition, a size and a thickness of each constituent element illustrated in the drawings are arbitrarily shown for convenience of description, but the present invention is not limited thereto. In order to clearly describe several layers and regions, thicknesses thereof are enlarged in the drawings. In the drawings, the thicknesses of some layers and regions are exaggerated for convenience of description.

In addition, when one component such as a layer, a film, a region, or a plate is described as being positioned "above" or "on" another component, one component can be positioned "directly on" another component, and one component can also be positioned on another component with other components interposed therebetween. On the contrary, when one component is described as being positioned "directly on" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, unless explicitly described to the contrary, the word "comprise/include" and variations such as "comprises/includes" or "comprising/including" will be understood to imply the inclusion of stated elements, not the exclusion of any other elements.

Throughout the specification, the word "in a plan view" means when an object is viewed from above, and the word "in a cross-sectional view" means when a cross section made by vertically cutting an object is viewed from a lateral side.

FIG. 2 is an exploded perspective view illustrating a state in which an electrode assembly according to an embodiment of the present invention is disassembled before the electrode assembly is wound. FIG. 3 is a perspective view illustrating a state in which the electrode assembly in FIG. 2 is wound. FIG. 4 is a perspective view illustrating a state in which a tape is attached to an outer peripheral surface of the electrode assembly in FIG. 3.

Referring to FIGS. 2 to 4, a method of manufacturing a secondary battery according to an embodiment of the present invention includes a step of manufacturing a jelly-roll electrode assembly 200 by winding a first electrode 210, a second electrode 220, and separators 230 and 240 together, and a step of attaching a tape 500 to cover an outermost edge portion 211ED of the electrode assembly 200.

Specifically, the jelly-roll electrode assembly 200 may be manufactured by winding the first electrode 210, the second electrode 220, and the separator 230 together. The separator 230 may be interposed between the first electrode 210 and the second electrode 220. Further, the separator 240 may be additionally disposed under the second electrode 220 in order to prevent the first electrode 210 and the second electrode 220 from adjoining each other when the first electrode 210, the second electrode 220, and the separator 230 are wound in a jelly-roll shape.

The first electrode 210 may include a first electrode current collector 211, and a first active material layer 212 formed on the first electrode current collector 211 by applying an electrode active material. Specifically, the first active material layer 212 is formed by applying the electrode active material onto the first electrode current collector 211. A first electrode tab 213 may be attached, by welding or the like, to a portion of the first electrode current collector 211 that is not coated with the electrode active material such that the first electrode current collector 211 is exposed. In this case, the first electrode tab 213 is illustrated as being positioned at one end of the first electrode 210, but the position of the first electrode tab 213 is not particularly limited. The first electrode tab 213 may be positioned at a central portion of the first electrode 210.

The second electrode 220 may include a second electrode current collector 221, and a second active material layer 222 formed on the second electrode current collector 221 by applying an electrode active material. Specifically, the second active material layer 222 is formed by applying the electrode active material onto the second electrode current collector 221. A second electrode tab 223 may be attached, by welding or the like to a portion of the second electrode current collector 221 that is not coated with the electrode active material such that the second electrode current collector 221 is exposed. In this case, the second electrode tab 223 is illustrated as being positioned at a central portion of the second electrode 220, but the position of the second electrode tab 223 is not particularly limited. The second electrode tab 223 may be positioned at one end of the second electrode 220.

Meanwhile, the first electrode current collector 211 includes an exposed portion 211E exposed to the outer peripheral surface of the electrode assembly 200. That is, the exposed portion 211E may be a portion of the first electrode current collector 211 that is exposed regardless of the attachment of the first electrode tab 213. As illustrated in FIG. 2, the exposed portion 211E may be positioned at the other end of the first electrode 210 spaced apart from the portion to which the first electrode tab 213 is attached. As illustrated in FIG. 3, the exposed portion 211E is exposed to the outer peripheral surface of the electrode assembly 200 when the electrode assembly 200 illustrated in FIG. 2 is wound. The tape 500 may be attached to the outer peripheral surface of the electrode assembly 200. The tape 500 according to the present embodiment may extend in a height direction d1 of the electrode assembly 200 and cover the outermost edge portion 211ED of the exposed portion 211E. For the convenience of description, FIG. 3 illustrates a state before the tape is attached, and FIG. 4 illustrates a state after the tape is attached.

In this case, the outer peripheral surface of the electrode assembly 200 means an outer curved portion of the wound electrode assembly 200 having a cylindrical shape. The height direction d1 of the electrode assembly 200 means directions (z-axis direction and –z-axis direction) in which the electrode tabs 213 and 223 protrude relative to the electrode assembly 200. The outermost edge portion 211ED of the exposed portion 211E means one end that is finally wound when the first electrode 210 is wound.

The first electrode current collector 211 extends toward one side to form the exposed portion 211E, and the exposed portion 211E is further wound to the extent that the first electrode current collector 211 extends. Therefore, the exposed portion 211E may be formed on at least a part of the outer peripheral surface of the electrode assembly 200.

FIG. 5 is a perspective view illustrating a state in which the electrode assembly in FIG. 4 is accommodated in a battery casing.

Referring to FIGS. 4 and 5, the method of manufacturing a secondary battery according to the present embodiment includes a step of accommodating the electrode assembly 200 in a battery casing 300 opened at an upper side thereof. The battery casing 300 is a structure for accommodating the electrode assembly 200 impregnated with the electrolyte. The battery casing 300 may be made of a metallic material and be a cylindrical casing.

Because the tape 500 covers the outermost edge portion 211ED of the wound jelly-roll electrode assembly 200, it is possible to prevent the wound electrode assembly 200 from being unwound during the manufacturing process of moving the electrode assembly 200 or accommodating the electrode assembly 200 in the battery casing 300. As described above, to prevent the electrode assembly 200 from being unwound, the tape 500 may be continuously formed in the height direction d1 instead of a direction d2 in which the electrode assembly 200 is wound.

FIG. 6 is a perspective view illustrating a step of removing the tape from the electrode assembly according to the embodiment of the present invention.

Referring to FIGS. 4 to 6, the method of manufacturing a secondary battery according to the present embodiment includes a step of removing the tape 500 attached to the electrode assembly 200 from the electrode assembly 200. Specifically, the tape 500 attached to the outer peripheral surface of the electrode assembly 200 may be removed in the state in which the electrode assembly 200 is accommodated in the battery casing 300.

In this case, as illustrated in FIG. 4, the tape 500 according to the present embodiment may include a first portion 510 attached to the electrode assembly 200, and a second portion 520 extending in an upward direction of the electrode assembly 200 from the first portion 510.

In the step of removing the tape 500, the tape 500 is removed from the electrode assembly 200 by pulling the second portion 520 of the tape 500. That is, to make it easy to remove the tape 500, the second portion 520 of the tape 500 may extend in the upward direction from the electrode assembly 200 and be exposed. In addition, the first portion 510 is a portion having adhesiveness and configured to be attached to the outer peripheral surface of the electrode assembly 200, whereas the second portion 520 according to the present embodiment may be a portion having no adhesiveness. For the convenience of processes, the second portion 520 may have no adhesiveness because the second portion 520 need not be attached to other components as well as the electrode assembly 200.

In addition, the first portion 510 of the tape 500 may have a somewhat low bonding force so that the tape 500 is easily removed.

FIG. 7 is a cross-sectional view illustrating a cross-section taken along cutting line A-A' in FIG. 6. In this case, FIG. 7 illustrates a state after the tape 500 illustrated in FIG. 6 is removed.

Referring to FIGS. 3, 4, 6, and 7, when the tape 500 is removed in the step of removing the tape 500, the electrode assembly 200 may be unwound in the battery casing 300, and the exposed portion 211E may come into contact with an inner wall of the battery casing 300. That is, when the tape 500 is pulled so as to be removed, the wound electrode assembly 200 is naturally unwound in the battery casing 300 by a pulling force. Therefore, the exposed portion 211E, which is exposed to the outer peripheral surface of the electrode assembly 200, may be in contact with the inner wall of the battery casing 300. Because the tape 500 is completely removed, the exposed portion 211E may be in contact with the inner wall of the battery casing 300 through a large area.

Specifically, although not illustrated, the first electrode tab 213 protruding from the electrode assembly 200 may be joined to a bottom of the battery casing 300 and serve as an electrode terminal for connecting the battery casing 300 to an external circuit. In this case, the contact between the exposed portion 211E and the inner wall of the battery casing 300 may ensure an additional electron movement route in addition to the first electrode tab 213. Because the additional electron movement route is ensured, the resistance of the secondary battery 100 may be reduced. Therefore, the lifespan and efficiency of the secondary battery according to the present embodiment may be improved.

In addition, heat is generated from the electrode assembly 200 of the secondary battery as the secondary battery is repeatedly charged and discharged. Because the exposed portion 211E of the electrode assembly 200 is in direct contact with the battery casing 300, the heat may be easily dissipated to the outside, thereby improving the heat dissipation performance.

In the case of the secondary battery 10 in the related art illustrated in FIG. 1, the electrode assembly 20 is accommodated in the battery casing 30 in the state in which the sealing tape 50 is attached to the outer peripheral surface of the electrode assembly 20, and then the battery casing 30 is sealed by the cap assembly 70. Even though the electrode current collector is exposed to the outer peripheral surface of the electrode assembly 20, the sealing tape 50 attached to the outer peripheral surface of the electrode assembly 20 inevitably restricts the contact between the electrode current collector and the battery casing. For this reason, the secondary battery 10 in the related art is inevitably poor in terms of resistance characteristics or heat dissipation performance in comparison with the secondary battery manufactured by removing the tape 500 according to the embodiment of the present invention.

FIG. 8 is a graph for comparing resistance characteristics between the secondary battery including the electrode assembly according to the embodiment of the present invention and the secondary battery including the electrode assembly in the related art.

Referring to FIG. 8, the secondary battery including the electrode assembly to which the two sealing tapes 50 are attached as illustrated in FIG. 1 corresponds to sample A. The secondary battery including the electrode assembly from which the tape 500 is removed according to the embodiment of the present invention corresponds to sample E. In this case, a tape made of polyimide was used as the sealing tape 50 of sample A.

Resistance of sample A and resistance of sample E were measured by a 1 khz HIOKI AC resistance measurer. Ten samples were provided, and distribution levels were checked.

It can be seen from the result of measuring the resistance characteristics that the resistance characteristics of the secondary battery from which the tape removed according to the present embodiment are improved by about 1 m ohm in comparison with the secondary battery in the related art to which the sealing tape is attached.

FIG. 9 is a partial view illustrating an upper portion of a tape according to another embodiment of the present invention.

As described above, the second portion 520 of the tape 500 according to the embodiment of the present invention may have no adhesiveness. A tape 500a according to another embodiment of the present invention may include a first portion 510a attached to the electrode assembly 200, and a second portion 520a extending in the upward direction of the electrode assembly 200 from the first portion 510a. In this case, the second portion 520a may be in a state in which the second portion 520a is folded so that portions AP having adhesiveness face each other. A part of an upper end of the tape 500a having the portions AP each having adhesiveness on only one surface is folded so that the portions AP having adhesiveness face each other, such that the first portion 510a and the second portion 520a may be simply provided.

Therefore, the second portion 520a is not attached to the other components as well as the electrode assembly 200. Further, the tape 500a may be removed from the electrode assembly in the battery casing by pulling the second portion 520a.

Hereinafter, a tape according to a modified embodiment of the present invention will be described with reference to FIGS. 10 and 11.

FIG. 10 is a perspective view illustrating an electrode assembly and a tape according to a modified embodiment of the present invention. FIG. 11 is a top plan view illustrating the electrode assembly and the tape in FIG. 10.

Referring to FIGS. 10 and 11, a tape 500b according to the modified embodiment of the present invention is attached to cover the outermost edge portion 211ED of the jelly-roll electrode assembly 200. The electrode assembly 200 is inserted into the battery casing, and then the tape 500b is removed from the electrode assembly 200. In this point, the tape 500b is similar to the above-mentioned tape 500.

The tape 500b according to the modified embodiment of the present invention includes a first portion 510b attached to the electrode assembly 200, and a second portion 520b extending in the upward direction of the electrode assembly 200 from the first portion 510b. The tape 500b is removed from the electrode assembly 200 by pulling the second portion 520b.

However, the tape 500b according to the present embodiment differs from the above-mentioned tapes in that a bending portion BP, which is a curved portion, is provided between the first portion 510b and the second portion 520b. The bending portion BP is formed at lower sides of the first and second portions 510b and 520b. In other words, the bending portion BP, which separates the first portion 510*b* and the second portion 520*b*, may be formed by bending the tape 500*b* upward once according to the present embodiment. FIG. 10 illustrates that the first portion 510*b* and the second portion 520*b* are somewhat spaced apart from each other for the convenience of description. However, as illustrated in FIG. 11, the first portion 510*b* and the second portion 520*b* may be in close contact with each other.

In this case, as illustrated in FIG. 11, the portion AP of the first portion 510*b*, which has adhesiveness, may be positioned at a side directed toward the electrode assembly 200. The portion AP of the second portion 520*b*, which has adhesiveness, may be positioned at a side opposite to the electrode assembly 200. That is, the portion AP having adhesiveness may be provided on the outer portion of the tape 500*b*.

In a step of removing the tape 500*b* according to the present embodiment, the tape 500*b* may be removed by pulling the second portion 520*b* in the upward direction. As the second portion 520*b* is pulled in the upward direction, the tape 500*b* may be naturally removed from the electrode assembly 200 while being moved upward. That is, according to the present embodiment, the tape 500*b* has the bending portion BP, such that the tape 500*b* may be more easily removed. In particular, there is a process advantage in that in the limited space in the battery casing, the tape 500*b* may be naturally removed by an upward force.

FIG. 12 is a perspective view illustrating the secondary battery to which a cap assembly is coupled.

Referring to FIGS. 6 and 12, a cap assembly 700 is coupled to the opened upper side of the battery casing 300 after the tape 500 is removed, such that the battery casing 300 may be sealed, and the secondary battery 100 may be manufactured.

The battery casing 300 and the cap assembly 700 may be coupled by crimping coupling by bending the upper end of the battery casing 300 in a direction toward the cap assembly 700.

In the present embodiment, the terms 'front,' 'rear,' 'left,' 'right,' 'upper,' and 'lower' have been used to indicate the directions. However, these terms may be changed depending on a position of a target object or a position of an observer.

A battery module may be configured by assembling the plurality of secondary batteries manufactured according to the present embodiment. The battery modules may be mounted together with various types of control and protection systems such as a battery management system (BMS), a cooling system, and the like, thereby constituting the battery pack.

The secondary battery, the battery module, or the battery pack may be applied to various devices. Specifically, the battery module or the battery pack may be applied to transportation means such as electric bicycles, electric vehicles, hybrid vehicles, and the like, but the present invention is not limited thereto. The battery module or the battery pack may be applied to various devices capable of using the secondary battery.

Although preferred examples of the present invention have been described in detail hereinabove, the right scope of the present invention is not limited thereto, and many variations and modifications of those skilled in the art using the basic concept of the present invention, which is defined in the following claims, will also belong to the right scope of the present invention.

DESCRIPTION OF REFERENCE NUMERALS

200: Electrode assembly
211E: Exposed portion
211ED: Outermost edge portion
500, 500*a*, 500*b*: Tape

The invention claimed is:

1. A method of manufacturing a secondary battery, the method comprising:

manufacturing an electrode assembly by winding a first electrode, a second electrode, and a separator together;

attaching a tape to cover an outermost edge portion of the electrode assembly;

accommodating the electrode assembly in a battery casing having an open end; and removing the tape attached to the electrode assembly from the electrode assembly, wherein the tape comprises a first portion attached to the electrode assembly, and a second portion extending from the first portion in a first direction towards the open end of the battery casing, the second portion of the tape extending in the first direction from the electrode assembly and being exposed, and wherein, in the removing the tape, the tape is removed by pulling the second portion.

2. The method of claim 1, wherein:

the tape extends in an axial direction of the electrode assembly to cover the outermost edge portion of the electrode assembly.

3. The method of claim 1, wherein:

the first electrode comprises a first electrode current collector, and a first active material layer formed by applying an electrode active material onto the first electrode current collector, and the first electrode current collector comprises an exposed portion exposed to an outer peripheral surface of the electrode assembly of which the exposed portion includes the outermost edge portion.

4. The method of claim 3, wherein:

as the tape is removed in the removing the tape, the electrode assembly is unwound in the battery casing, and the exposed portion contacts an inner wall of the battery casing.

5. The method of claim 1, wherein:

the second portion is a portion having no adhesiveness.

6. The method of claim 1, wherein:

the second portion is folded so that portions of the second portion having adhesiveness face each other.

7. The method of claim 1, wherein:

the tape comprises a bending portion that is a portion curved between the first portion and the second portion.

8. The method of claim 7, wherein:

the bending portion is formed at lower sides of the first portion and the second portion.

9. The method of claim 8, wherein:

in the removing the tape, the tape is removed by pulling the second portion in an axial direction of the electrode assembly.

10. The method of claim 7, wherein:

a portion of the first portion, which has adhesiveness, is positioned to face toward the electrode assembly, and a portion of the second portion, which has adhesiveness, is positioned to face away from the electrode assembly.

11. The method of claim 1, wherein:

the battery casing is a cylindrical casing.

* * * * *